United States Patent [19]
Zievers et al.

[11] Patent Number: 5,766,290
[45] Date of Patent: Jun. 16, 1998

[54] CROSS FLOW FILTER DESIGN

[75] Inventors: James F. Zievers, LaGrange; Paul Eggerstedt, Plainfield; Elizabeth C. Zievers, LaGrange, all of Ill.

[73] Assignees: Universal Porosics, Inc.; Industrial Filter & Pump Mfg. Co., both of Cicero, Ill.

[21] Appl. No.: 752,605

[22] Filed: Nov. 19, 1996

[51] Int. Cl.$^6$ ............................. C04B 38/00; B01D 39/20
[52] U.S. Cl. ........................... 55/523; 55/524; 55/527; 55/DIG. 5
[58] Field of Search .................. 55/523, 524, 521, 55/527, DIG. 5, 302

[56] References Cited

U.S. PATENT DOCUMENTS

| | | | |
|---|---|---|---|
| 3,112,184 | 11/1963 | Hollenbach | 55/521 |
| 3,502,596 | 3/1970 | Sowards | 55/521 |
| 4,017,347 | 4/1977 | Cleveland | 55/523 |
| 4,157,929 | 6/1979 | Kubicek | 55/523 |
| 4,364,761 | 12/1982 | Berg et al. | 55/523 |
| 4,652,286 | 3/1987 | Kusuda et al. | 55/521 |
| 4,960,448 | 10/1990 | Zievers | 55/523 |
| 4,960,449 | 10/1990 | Yonushonis | 55/523 |
| 5,009,857 | 4/1991 | Haerle | 55/523 |
| 5,082,480 | 1/1992 | Dorazio | 55/523 |
| 5,194,414 | 3/1993 | Kuma | 55/523 |
| 5,238,478 | 8/1993 | Zievers et al. | 55/523 |

FOREIGN PATENT DOCUMENTS 3537976  4/1987  Germany .................. 55/523

OTHER PUBLICATIONS

Gas Stream Cleanup Papers—Oct. 1988, DOE/METC.

*Primary Examiner*—Duane S. Smith
*Attorney, Agent, or Firm*—Patnaude Videbeck & Marsh

[57] ABSTRACT

An improved cross flow ceramic filter is disclosed for utilization in high temperature, high pressure applications such as found in hot gas cleaning in coal based power generation. The cross flow ceramic filter of the present invention includes a plurality of identical corrugated sheets composed of chopped ceramic fiber matrix material and a plurality of predetermined sized end blocks shaped to fill the cross section passageways formed between the partly spaced corrugations of adjacent sheets of the filter material. One advantage of the corrugated sheet cross flow filter of the present invention is that the filter may be shipped to its site in semi-cured form unassembled. When the filter is received on site, the corrugated sheets are partially separated from each other until passageways of the desired dimension are achieved. Thereafter, the end blocks and glue may be applied between the blocks and the ends of the corrugated sheets and between the apexes of the corrugations where the corrugated sheets overlap. A final cure for the filter may be made with the filter in place in the filter vessel utilizing high temperature, high pressure flue or fuel gas on site.

5 Claims, 3 Drawing Sheets

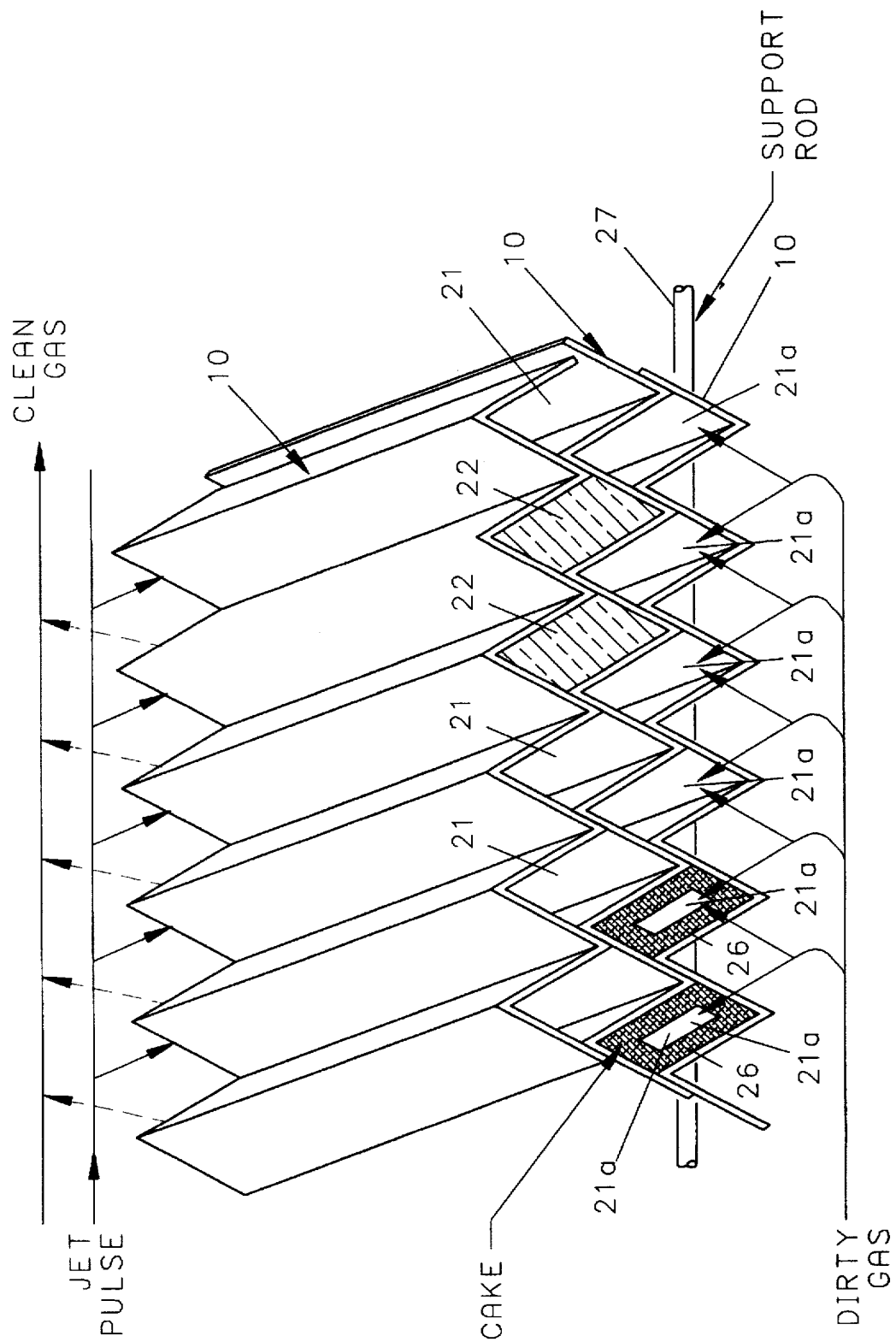

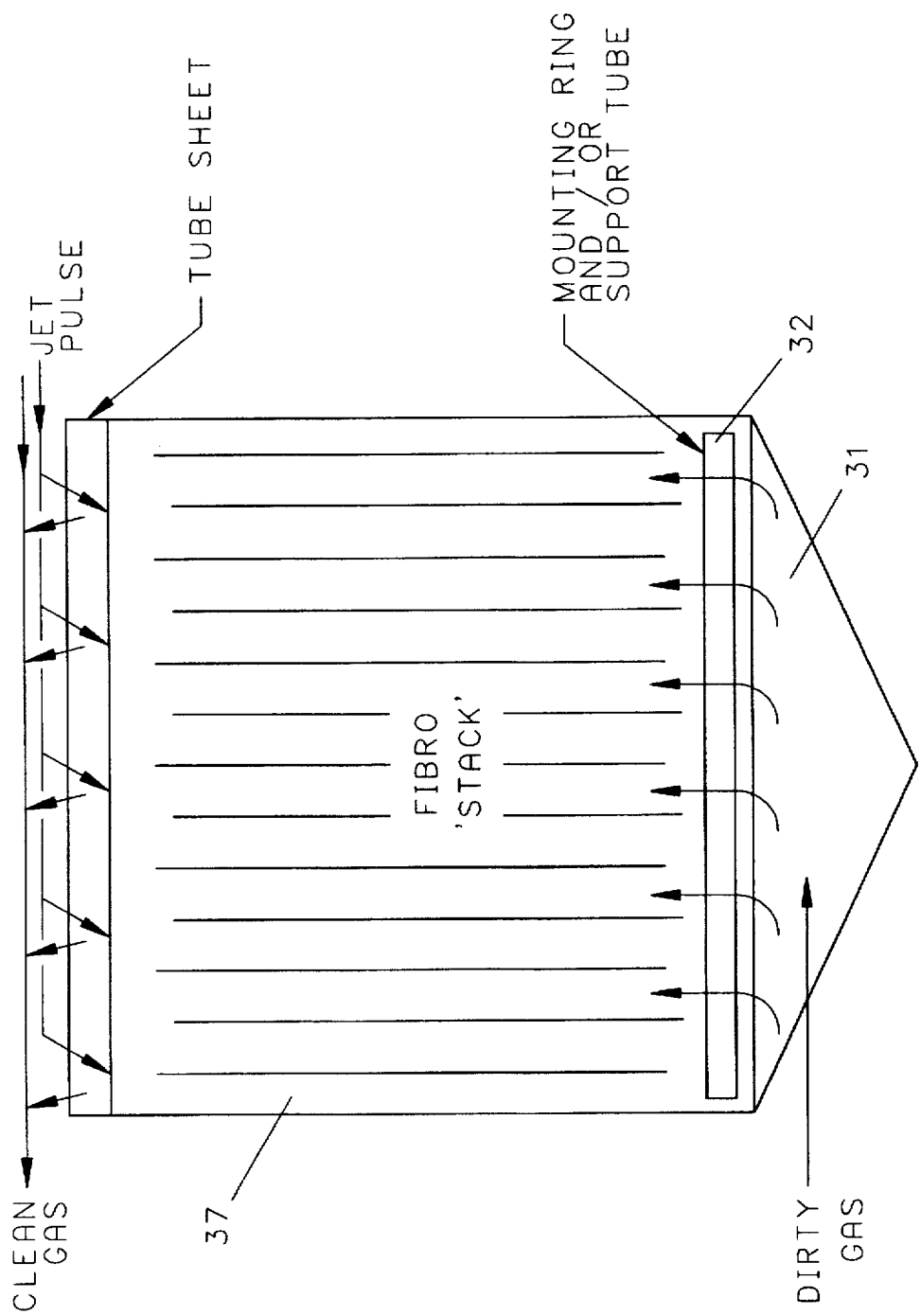

5,766,290

1
CROSS FLOW FILTER DESIGN

The present invention relates generally to cross flow filters for removing particulates from a stream of hot gas such as flue gas and, more particularly, to a new and improved corrugated cross flow filter element and to a method of manufacturing and assembling same.

BACKGROUND OF THE INVENTION

Coal fueled power generation exists with a need for hot gas clean up processes in order to produce a clean fuel gas and flue gas suitable for gas turbine applications. Cross flow type filter modules have been developed which are capable of operating at the extreme temperatures (2000 degrees F.) encountered in both coal gasification and combustion processes. Granular ceramic cross flow filters are capable of removing particulate matter from the hot gases to well within New Source Performance Standards (NSPS) for emissions. While other types of ceramic filters may also be used in such hot gas clean up processes, cross flow type filters offer some distinct advantages, including: high surface area-to-volume ratio, i.e., more effective filter surface area for a given vessel size; modular design; and a geometry which is less susceptible to catastrophic failure. Heretofore, such types of cross-flow filters have included multiple layers of thin, flat porous rectangular plates or flats positioned in spaced relation to one another with ceramic blocks and ribs formed of like materials positioned between those plates or flats providing channels through which the dirty gas flows. Typically, the gas would flow into channels formed in one direction, cross through the thin, flat porous rectangular ceramic plates or flats, and then flow out of the filter through exit passageways formed above and below the inlet passageways, typically at a 90 degree angle to the direction of inlet flow. Alternately, ceramic cross flow modules may be formed or molded to include a central thin, porous rectangular ceramic plate having ribs and/or blocks molded integrally with the plate above and below the plate at 90 degree offsets relative one another. Multiples of these building block type units may be positioned together to form a cross flow filter.

While heretofore known cross flow filters have been used in coal based power generation, the granular structures of such traditional ceramics such as alumina, cordierite, etc., while being strong at both ambient and elevated temperatures, have not been able to withstand the repeated thermal cycling and thermal shock occurring during reverse pulse cleaning with unheated air or nitrogen. Because such traditional granular ceramics work best under compression rather than under the shock and thermal cycling associated with reverse pulse cleaning with unheated air or nitrogen, micro cracks and other flaws within the ceramic matrix eventually propagate, leading to catastrophic or delamination failure of the heretofore known cross flow filters.

A need has developed for an improved material for use in cross flow filters which is capable of withstanding the repeated thermal cycling and thermal shock resulting from reverse pulse cleaning with unheated air nitrogen.

Another need has developed for an improved, simplified design for a cross flow ceramic filter that eliminates the need for providing separate ribs of ceramic material that are positioned between layers of thin, flat porous rectangular ceramic plates or flats.

It is, therefore, an object of the present invention, generally stated, to provide a new and improved cross flow filter made of ceramic material that is superior to such ceramic material as heretofore used in cross flow filters.

2

Another object of the present invention is the provision of an improved thin porous generally rectangular ceramic plate structure that eliminates the need for using ceramic ribs between sheets of such ceramic plate material.

SUMMARY OF THE INVENTION

The invention resides in a ceramic element for use in a cross flow filter. The element includes a first sheet of corrugated ceramic material including ceramic fibers bonded together in a porous unitary structure. The sheet includes alternate rows of substantially parallel complementary ridges and grooves extending across the width of the sheet.

The invention further resides in a second sheet of corrugated ceramic fiber material shaped substantially identical to the first sheet. The filter element includes means for maintaining first and second sheets in partial spaced relation to each other to define parallel hollow first passageways running the width of the sheet.

The invention further resides in a third sheet of corrugated ceramic material shaped substantially identical to the first and second sheets. The element further includes means for maintaining the second and third sheets in partial spaced relation to each other defining parallel hollow second passageways running the width of the sheets. The first passageways and the second passageways are separated by one of the first, second and third sheets defining a porous filter surface through which gasses are capable of passing while particulate matter is prohibited from passing therethrough.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings wherein like reference numerals identify like elements throughout, and in which:

FIG. 4 is a diagramatic perspective view of a plurality of cross flow filter sheets positioned as shown in FIG. 3 showing the path of gas through the filter, and the path of the reverse jet pulse cleaning gas; and FIG. 5 is a diagramatic view of an alternative positioning of corrugated filter sheets in a filter vessel with the sheets positioned in vertical relation.

DETAILED DESCRIPTION OF THE PREFERRED EMBODIMENTS

Figure 1:
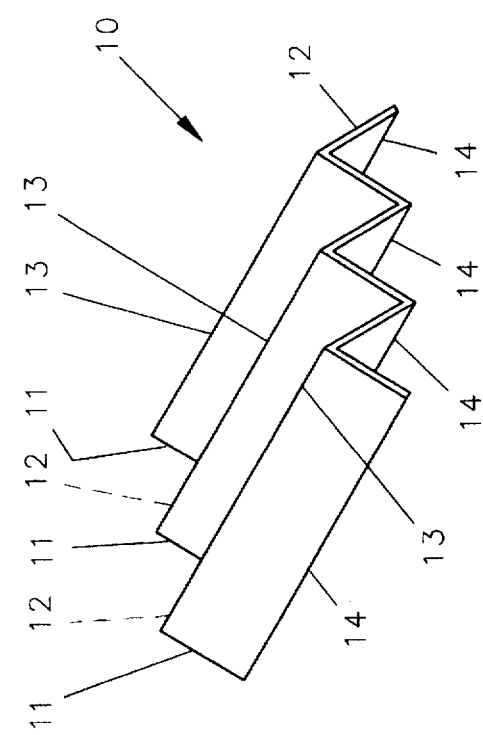
FIG. 1 is a perspective view of a corrugated cross flow filter sheet constructed in accordance with the present invention.

Referring to FIG. 1, a corrugated sheet 10 of porous ceramic material constructed in accordance with the invention includes a plurality of strakes or elongate backfolded portions 11–12 joined together at their respective side surfaces or edges 13–14 to form a corrugated sheet with each of the strakes 11–12 being equally sized in width and length. In order to withstand repeated thermal cycling and the thermal shock associated with reverse pulse cleaning with unheated nitrogen as found in current cross flow filters, a preferred embodiment of the invention is made with ceramic material including a chopped ceramic fiber matrix bonded together into a porous unitary corrugated sheet 10. Materials useful in this improved cross flow filter are shown and described at U.S. Pat. Nos. 4,960,448 and 5,238,478, the disclosures thereof being incorporated herein by reference.

For example, if the included angle between opposing strakes 11 and 12 is 60 degrees a plurality of strakes would form a cross section having defining equilateral triangles with the base of each triangle being the open side between like numbered strake side edges 13—13 and 14—14. Depending on the capacity of the end product filter, the width of each strake from edge 14 to edge 13 and the length of each strake, along with the thickness thereof may be varied during manufacture of same. Likewise, the porosity of each corrugated sheet may be varied by using ceramic fibers of varying thicknesses and lengths and binders and fillers having the capacity to provide intersticies therebetween of desired predetermined sizes. Also, after initial fabrication, if it is desired that one surface of the corrugated sheet 10 have a porosity differing from an opposing surface thereof, a layer or coating of ceramic material having the desired porosity may be applied to either outer surface of corrugated ceramic sheet 10.

Construction of corrugated sheet 10 in accordance with the present invention may be accomplished by depositing chopped ceramic fiber matrix in a mold and molding same, or by vacuum forming corrugated sheet 10 by pulling the chopped ceramic fiber matrix against a corrugated surface in a slurry of the chopped ceramic fiber matrix material until the desired thickness of the corrugated sheet 10 is achieved. If necessary, the free side of the sheet may be machined. Thirdly, the corrugated layer may be machined from a thicker layer of chopped ceramic fiber matrix such as a slab of same having the strakes 11–12 machined out of a flat slab.

Figure 3:
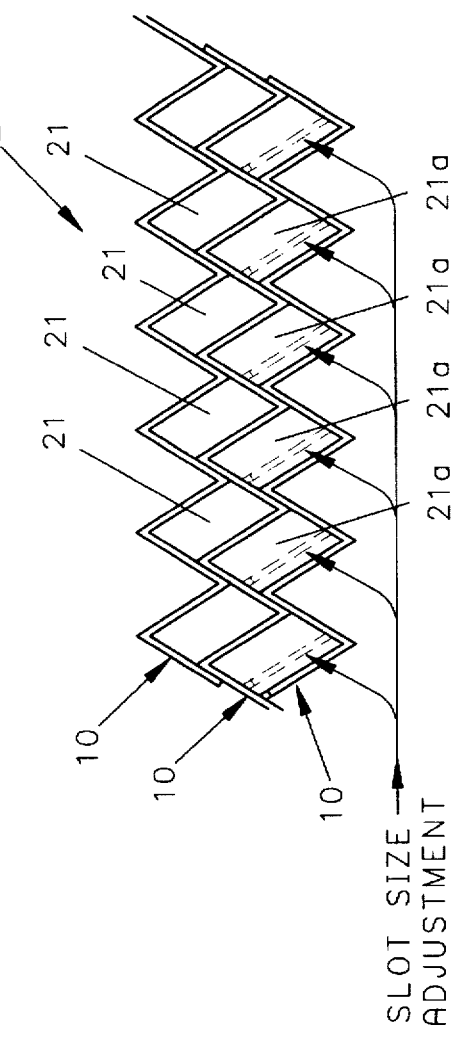
FIG. 3 is a diagramatic end view of a plurality of corrugated sheets of cross flow filter material positioned above and below one another in sliding adjustable relation to one another.

Referring to FIG. 3, a cross flow filter 20 constructed in accordance with the present invention includes a plurality of corrugated chopped ceramic fiber matrix sheets 10—10 positioned in partially spaced relation with one another in superior-inferior position thereto. In the preferred embodiment of the invention, each of the corrugated sheets 10—10 may be positioned in partial spaced relation to the corrugated sheet 10 therebelow and thereabove by sliding the short dimension of the strakes relative to one another forming hollow diamond shaped passageways 90 degrees to that movement with adjacent sides of opposing triangular strakes on adjacent corrugated panels 10—10 defining the sides of the passageways. The volume of each of the passageways 21—21 may be varied depending on how far up a strake 11, 12 the adjacent sheet 10 is slid, as shown in dotted line in FIG. 3.

Figure 2:
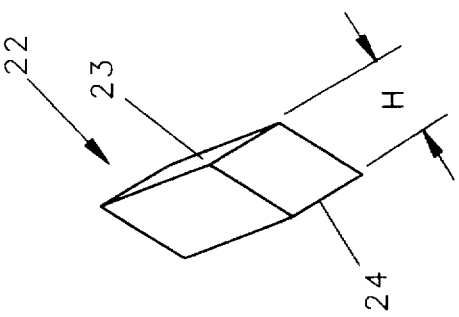
FIG. 2 is a perspective view of a spacer end block for positioning between sheets of corrugated cross flow filter material.

Referring to FIG. 2, a diamond shaped six sided polyhedron block 22, preferably made of chopped ceramic fiber matrix material includes opposing identical sides 23, 24 having a length equal to the width of each strake 11–12 of the corrugated sheet between the opposing side edges 14–13, and a predetermined and variable height H sized to provide the desired predetermined area of the passageways 21, 21. A plurality of blocks 22—22 are then positioned in each passageway 21—21 at the end of a row of such passageways formed by the joinder of like corrugated sheets 10—10, as shown most clearly in FIG. 4, in order to provide for cross flow of the high temperature high pressure (HTHP) fuel or flue gas, another set of chopped ceramic fiber matrix blocks 22—22 is positioned at the opposing end of the cross flow filter 20 in an adjacent row of passageways 21A—21A.

As shown in FIG. 4, with the corrugated sheets 10 of the invention positioned in partial spaced relation and the blocks 22—22 positioned in the passageways 21—21 at the near end of the filter, and the identical blocks 22—22 (not shown) positioned in the opposite end of the passageways 21A—21A, dirty gas may flow in the passageways 21A—21A and then proceed through the strakes of the middle corrugated sheet 10 as shown in FIG. 4 into the clean gas passageways 21—21.

As shown most clearly in FIG. 4, with the dirty gas entering passageways 21A—21A, eventually particulate matter filtered out of the gas as it passes through the corrugated sheet 10 leaves a cake buildup shown at 26—26 in passageways 21A—21A. By periodically blowing a reverse jet pulse of air or inert nitrogen backwards through the filter, as shown in FIG. 4, the cake buildup 26—26 may be dislodged from its position on the dirty side of the corrugated sheets 10—10. It should be noted that with the reverse jet pulse of air or inert nitrogen, as the particulate matter in the cake 26—26 is dislodged and blown backwardly in the dirty part of the filter, the particulate matter after dislodgement tends to impinge upon and dislodge additional particulate matter in a manner that further aids dislodgement of cake and the exhaust of that particulate matter out of the dirty side of the filter.

It should be noted that with the partial separation of each of the corrugated filter sheets 10—10 and the positioning of blocks 22—22 in alternating rows of end openings between the corrugated sheets 10—10 to produce the cross flow filter of the invention, that the blocks 22—22 may be bound therein by a high temperature ceramic adhesive. This glue may also be used in between adjacent apexes of the strakes defined by edges 13–14 to glue the opposing corrugated sheets together at a desired position of partial separation that extends entirely along those apexes 13–14, thus providing a seal between adjacent horizontal passageways in the embodiment shown in FIG. 1. It should be understood that the joinder formed by the use of such glue may be stronger when the cross flow filter is cured than the strength of the strake side walls 11–12 of the filter.

It should be noted that one substantial benefit of a cross flow filter 20 constructed in accordance with the present invention by using a plurality of corrugated sheets as shown in FIG. 1 is that shipment of a plurality of sheets 10—10 may be accomplished with those sheets being nested side by side with no partial spacing therebetween, thus lessening shipping expenses. When the filter elements arrive at the assembly site, along with the plurality of blocks 22—22, the sheets 10—10, blocks 22—22 and binder or ceramic adhesive may be utilized to assemble the filter 20 on site. In one preferred embodiment of the invention, the sheets 10—10, blocks 22—22 and glue are shipped in semi-cured form. After the cross flow filter of the invention is assembled and glued on site, heated flue or flue gas may be utilized to provide a final cure for the filter 20 on site.

Referring to FIG. 5, in a second embodiment of the invention, a corrugated cross flow filter 30 is mounted with the sheets thereof positioned vertically in a vessel 31 in an orientation 90 degrees from that shown in FIG. 4. In this embodiment, dirty gas enters through the bottom of the vessel and clean gas exits out the top of the vessel. A reverse jet pulse for cleaning purposes pulses downwardly from the top of the vessel to dislodge cake downwardly toward the bottom of the vessel 31 where it may be cleaned out of the vessel. As shown most clearly in FIGS. 4 and 5, the corrugated sheet cross flow filters 20 and 30 may be supported in vessels by ceramic mounting rings and/or support rods 27–32, respectively.

While the present invention has been described in connection with two embodiments thereof, it will be understood that many changes and modifications may be made without departing from the true spirit and scope of the invention. For example, the corrugations could be of differing shapes, such as rectangular, sine wave, etc., and as long as the ridges and grooves are complementary, the passageways will be formed. It is intended by the appended claims to cover all such changes and modifications which fall within the true spirit and scope of the invention.

What is claimed:

1. A ceramic element for use in a cross flow filter, said element comprising:

a first sheet of corrugated ceramic material including ceramic fibers bonded together into a porous unitary structure, said sheet including alternate rows of substantially parallel complementary ridges and grooves extending across the width of said sheet, a second sheet of corrugated ceramic fiber material shaped substantially identical to said first sheet and including alternate rows of substantially parallel complementary ridges and grooves extending across the width of said sheet, corresponding ridges of one of said first and second sheets being matingly interfitable with corresponding grooves of the other of said first and second sheets, and means for maintaining said first and second sheets in partial spaced relation to each other defining parallel hollow first passageways defined by ridges of one of said first and second sheets and grooves of the other of said first and second sheets running the width of said sheets and variability of the size of said means for maintaining said first and second sheets in partial spaced relation directly varying the flow through capacity of said filter.

2. The ceramic element as defined in claim 1 wherein said means for maintaining said first and second sheets in partial spaced relation includes a block of ceramic material bonded together to form a solid structure and having a circumference defined by at least part of a cross section shape of one of said grooves and at least part of a cross section shape of one of said ridges for fitting said block thereon in mating engagement therewith.

3. The ceramic element as defined in claim 1 further including a third sheet of corrugated ceramic material shaped substantially identical to said first and second sheets including rows of substantially parallel complementary ridges and grooves extending across the width of said sheet, and means for maintaining said second and third sheets in partial spaced relation to each other defining parallel hollow second passageways running the width of said sheets, said first passageways and said second passageways being separated by one of said first, second and third sheets defining a porous filter surface through which gases are capable of passing and particulate material is prohibiting from passing.

4. The ceramic element as defined in claim 1 wherein said means for maintaining said first and second sheets in partial spatial relation include, a plurality of blocks of ceramic material bonded together to form solid structures and each having a cross-section shaped to close one of said passageways at an end thereof.

5. The ceramic element as defined in claim 3 wherein said means for maintaining said first and second sheets in partial spatial relation, and said means for maintaining said second and third sheets in partial spatial relation include:

a plurality of blocks of ceramic material bonded together to form solid structures and each having a cross-section shaped to close one of said passageways at an end thereof, at least a portion of said blocks being positioned to close a first row of passageways at one end of said filter element, and at least a portion of said blocks being positioned to close a second row of passageways at an opposing end of said filter element.

\* \* \* \* \*